Patented Oct. 21, 1952

2,614,964

UNITED STATES PATENT OFFICE 2,614,964

PROCESS OF PRODUCING GLYCERINE

Benjamin T. Brooks, Old Greenwich, Conn., assignor to The Glycerine Corporation of America, Inc., New York, N. Y., a corporation of New York No Drawing. Application January 3, 1949, Serial No. 69,030

1 Claim. (Cl. 195—38)

It has been known that when fermentable sugar is fermented by yeast under slightly alkaline conditions that a substantial proportion of the sugar is converted into glycerine and the balance undergoes alcohol fermentation. The recovery of the glycerine from the fermented mixture has been attempted but the separation of the glycerine from the fermented mixture has been greatly interfered with by the dark colored and gummy substances present and also solid matter consisting largely of dead yeast. Processes have been proposed for the distillation of the glycerine from the evaporated residue and it has also been proposed to concentrate the fermentation residue and extract the glycerine by means of solvents. The presence of the impurities mentioned, which are normally present in amounts greater than the glycerine which is to be recovered, renders the separation of glycerine difficult or even inoperative. Another method which has been suggested consists in separating the glycerine from the dead yeast, coloring matter and gums, by dialysing the residues, and in this process the glycerine dialyses through a cellulose membrane such as cellophane, but to carry out such a process in a practical manner it is necessary to concentrate the fermentation residues by distillation or evaporation until the residual solution contains upwards of about 15% glycerine and preferably 20 to 25% glycerine. I have found that in carrying out the latter process that during the concentration of the residues by distillation or evaporation the solid matter, largely dead yeast, cakes on the heating coils resulting in decomposition, thus resulting in contamination of the final product. Under these circumstances the heating is inefficient due to the accumulation of caked material on the heating coils. The presence of such solid matter which normally may amount to 30% or more by weight, is conducive to very troublesome foaming. Also, in the dialysis step the solid material in the concentrated residues frequently settles out and may plug the dialysing tubes and connecting pipes and valves. I find that it is impossible to filter the solid matter from these concentrated residues due to the presence of slimy or gelatinous material which plugs the filter even when substantial amounts of mineral filter aids are used.

The present invention consists in a series of operations and particularly of a method of overcoming the aforementioned difficulties. I find that when a solution of molasses or other fermentable sugar is fermented under slightly alkaline conditions, the yeast can be filtered from the solution if this filtering operation is done before the alcohol is distilled out of the solution, the yeast being killed by the heating incident to distilling off the alcohol. This purification step being done at this point in the sequence of operations affects all of the subsequent steps in the process. Thus, after the alcohol is distilled from the filtered solution the distillation residue containing glycerine may then be concentrated without any of the difficulties described above, such as foaming and caking on the heating coils, and the dialysis step is more efficient and the dialysing tubes never become plugged. The filtration step, when carried out as just described, eliminates the danger of bacterial putrefaction which readily takes place in the presence of dead yeast.

In the industrial manufacture of glycerine and alcohol from molasses or other sugar solutions by fermentation it is very advantageous to build up the concentration of glycerine as much as possible before dialysis. It is thus helpful to distill off the alcohol when the fermentation is complete, leaving the glycerine in the residue, and then to add a second lot of molasses to the residue, and fresh yeast and ferment a second time and repeat the process even a third time. However, this builds up the solid matter in the form of dead yeast which renders all the subsequent operations more difficult. By removing the live yeast by filtration after each fermentation step it is possible to carry out a larger number of successive fermentations without the danger of bacterial decomposition and without building up solid matter in the undistilled residue.

In a typical example of my process, one thousand gallons of molasses containing about 50% fermentable sugar were diluted with three thousand gallons of water, made slightly alkaline, preferably with potassium carbonate, to a pH of about 7.5, and fermented with yeast at about 85° to 95° F. When the fermentation was complete as indicated by the rapid decrease in carbon dioxide evolution and the tendency of the yeast to settle quickly to the bottom of the vessel, the contents of the tank were rapidly filtered through a filter press, and the filtrate pumped to a conventional alcohol still or beer still where the alcohol was removed by distillation. This is done with closed steam to avoid dilution. The undistilled solution containing glycerine was then fortified with a second charge of one thousand gallons of molasses, cooled to about 80° F. and fermented with fresh yeast and the above described operations repeated. Three such fermentations and successive operations as described, yielded a dark colored but clear solution containing about 3,600 pounds of glycerine. The yield or proportion of glycerine will vary somewhat with the alkalinity of the solution and the amount of fresh yeast added to each fermentation step. It will be understood also that the yield or proportions of glycerine will vary somewhat with different strains of yeast. The clear dark colored solution from the three fermentation and filtration steps just described was then concentrated by distillation under reduced pressure to a solution containing about 20% of glycerine. This concentrate was then subjected to dialysis in a conventional manner, passing the fresh water counter-current to the solution being dialysed, thus recovering in the dialysate about 90% of the glycerine present in the concentrate. Concentration of the dialysate and distillation by conventional methods yielded three thousand pounds of distilled purified glycerine.

It will be understood that the filtration step carried out as described makes it possible to perform more than three fermentations, and this can be done without departing from the process of the present invention. In fact, being able to accomplish more than one or two fermentation steps is one of the advantages of the present invention.

Although the present invention as described is particularly applicable to the prodction of glycerin and alcohol from molasses by fermentation, it is applicable with the advantages described to other fermentable sugar solutions as, for example, in solutions containing invert sugar, cane sugar, glucose or maltose.

The filtration of the yeast prior to partial distillation to remove alcohol may be carried out by means of a filter press using filter paper or filter cloth of fine porosity, or a continuous rotary type of filter can be employed. When the yeast cake is not to be used as food, it is advantageous to add infusorial earth, or similar material as a filter aid in amounts equal to about 10 to 40% of the yeast thus removed. Filtration of the yeast prior to alcohol distillation makes it possible to use the yeast thus recovered in a subsequent fermentation, thus effecting a substantial economy in the operation.

Having thus described my invention, what I claim is:

The method of producing glycerine from molasses which comprises the steps of diluting the molasses with approximately 3 times its weight of water, adding an alkaline carbonate to the molasses in amount only sufficient to produce a pH value of about 7.5, fermenting the resulting solution with yeast, filtering off the yeast, thereafter distilling the residue, fortifying the undistilled solution with undiluted molasses, repeating the steps of fermenting, filtering and distilling off alcohol until the undistilled solution remaining contains at least 15% of glycerine, thereafter dialyzing the undistilled concentrate, and separating glycerine from the dialysate.

BENJAMIN T. BROOKS.

REFERENCES CITED

The following references are of record in the file of this patent:

UNITED STATES PATENTS

| Number | Name | Date |
|---|---|---|
| 1,193,951 | Laszloffy | Aug. 8, 1916 |
| 1,698,800 | Ludecke et al. | Jan. 15, 1929 |
| 1,936,497 | Carothers | Nov. 21, 1933 |
| 2,390,779 | Cornwell | Dec. 11, 1945 |
| 2,437,939 | Cornwell | Mar. 16, 1948 |